Nov. 9, 1937.   A. PINTO   2,098,793
ALTERNATING CURRENT MOTOR CONTROL
Filed Jan. 16, 1937
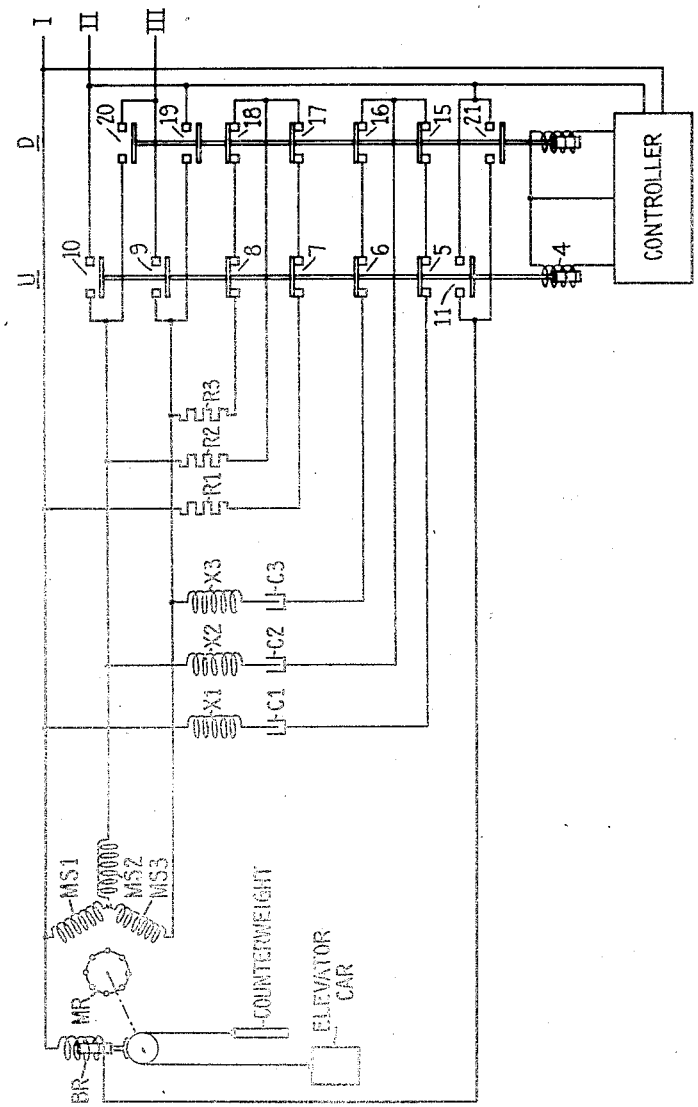
INVENTOR
Anthony Pinto
BY
ATTORNEY Patented Nov. 9, 1937

2,098,793

UNITED STATES PATENT OFFICE 2,098,793

ALTERNATING CURRENT MOTOR CONTROL

Anthony Pinto, New Rochelle, N. Y., assignor to Otis Elevator Company, New York, N. Y., a corporation of New Jersey Application January 16, 1937, Serial No. 120,844

3 Claims. (Cl. 172—152)

The invention relates to the control of alternating current motors and especially to the control of the slow down of such motors.

It is desirable in many instances that the slowing down of a motor be effected smoothly and so that the load driven thereby may be brought to an accurate stop at a predetermined point. This is especially true where the motor is employed to raise and lower the car and counterweight of an elevator system, as it is desirable that the retardation of the car be effected with no discomfort to passengers and so as to facilitate making accurate stops at the landings. In certain elevator installations, alternating current hoisting motors are utilized. These are usually polyphase squirrel cage induction motors. In such an installation, where it is desired to operate the car above a certain speed, an induction motor provided with multi-speed stator windings is employed and slow down is obtained by changing the connections in such way as to increase the number of stator poles, the machine thus being caused to operate as an induction generator and being slowed down by the regenerative braking effect obtained by pumping back into the supply lines. After reducing the speed of the motor to a low value, the motor is disconnected from the supply lines and an electromechanical brake is applied to bring the car to a stop. In the case of single speed induction motors, the motor is slowed down and stopped by disconnecting it from the supply lines and applying the electromechanical brake. In either case, the load on the hoisting motor affects the rate of slow down and accuracy of stop very markedly. The hoisting motor for an elevator car is required to operate over a wide range of load values, varying from lifting a heavy load, i. e., full car up and empty car down, to lowering a heavy load, i. e., empty car up and full car down. When the motor is lifting a heavy load, the load acts to assist in slowing down the car and bringing it to a stop, whereas, when the motor is lowering a heavy load, the load tends to maintain the car in motion, thereby opposing the slow down and stopping operation.

The principal object of the invention is to improve the slow down and stopping of alternating current motors.

One feature of the invention is to effect slow down of an induction motor, after its disconnection from the supply lines, by dynamic braking.

Another feature of the invention is to provide more uniform slow down and stopping of an induction motor under varying load conditions.

The invention involves providing excitation for an induction motor after its disconnection from the supply lines, causing it to act as an induction generator driven by the load until certain conditions obtain, effecting a braking action by the dissipation of power in the motor windings and preferably also in an electrical load connected thereto.

The invention will be described as applied to an elevator installation in which a single speed polyphase squirrel cage induction motor is employed to raise and lower the elevator car and counterweight. It is to be understood, however, that the invention is also applicable to induction motors having wound rotors, to multi-speed motors and to single phase motors.

In the preferred embodiment of the invention as applied to an elevator installation in which a single speed polyphase squirrel cage induction motor is employed, excitation of the motor after its disconnection from the source is provided by condensers connected across the motor stator windings. This causes the motor to operate as an induction generator driven by the elevator car or counterweight. Resistances are also connected across the stator windings of the motor, causing the motor to exert a dynamic braking effect to slow itself down so long as the excitation is provided. The electromechanical brake brings the car to a final stop and holds the car while at rest.

Using condensers of proper capacity, a condition is obtained whereby a maximum dynamic braking action over a maximum period is provided when the motor is lowering full load, which effect gradually decreases as the load decreases and may decrease to zero when the motor is lifting full load. This tends to equalize the distance required to slow down the elevator car under variable load conditions, aiding materially in the obtaining of accurate stops at the landings.

An inductance may be provided for each condenser to improve the effect thereof. Inductances have been included in the preferred embodiment illustrated, one in series with each condenser. By proper choice of inductances the desired value of exciting current of fundamental frequency may be obtained with condensers of lower capacity while the currents flowing through the condensers due to harmonics of the fundamental frequency are materially reduced, eliminating or greatly decreasing any noise due to higher frequency currents.

A general idea of the invention, the mode of carrying it out which is at present preferred, and the various features and advantages thereof will be gained from the above statements. Other features and advantages of the invention will be apparent from the following description and appended claims.

The drawing is a schematic wiring diagram of an embodiment of the invention applied to a three-phase squirrel cage induction motor. The motor is illustrated as arranged to raise and lower an elevator car and its counterweight, designated in the drawing by legend. The stator windings of the hoisting motor are designated MS1, MS2 and MS3, while the hoisting motor rotor is designated MR. The electromechanical brake for the hoisting motor is designated BR. The alternating current mains for supplying power to the hoisting motor are designated I, II and III.

Application of power from the supply mains to the stator windings of the hoisting motor is controlled by reversing switches designated generally as U and D, as indicative of up reversing switch and down reversing switch respectively. These switches are also illustrated as controlling the operation of the electromechanical brake. These switches form a part of the elevator controller, but the remainder of the controller is not shown in detail, being indicated by a rectangle upon which the legend "Controller" is applied. It is to be understood that the controller may be arranged to control the operation of the elevator car in various ways, depending upon the requirements of the particular installation. The car may be under the manual control of an operator in the car, it may be under the control of the passengers themselves, or a conjoint manual and automatic control may be provided. The manner in which the circuits for the coils of the reversing switches are controlled depends upon the particular type of elevator controller employed.

The condensers for providing excitation for the motor when the motor has been disconnected from the supply lines are designated C1, C2 and C3. These condensers are illustrated as subject to the reversing switches to be connected across the motor stator windings when the motor is disconnected from the supply lines. An inductance is arranged in series with each condenser, these inductances being designated X1, X2 and X3. The dynamic brake resistances are designated R1, R2 and R3 and are also subject to the reversing switches so as to be connected across the stator windings when the motor is disconnected from the supply lines.

In operation, upon the completion of the circuit for coil 4 of up reversing switch U, contacts 5, 6, 7 and 8 open while contacts 9, 10 and 11 close. The closing of contacts 11 causes the energization of the release coil of the electromechanical brake BR to lift the brake, and the closing of contacts 9 and 10 causes the application of voltage to the stator windings of the hoisting motor, with the phase rotation such as to cause the car to be started in the up direction.

In bringing the car to a stop, coil 4 is de-energized to drop out up reversing switch U. The opening of contacts 11 disconnects the release coil of the electromechanical brake from the supply lines and the opening of contacts 9 and 10 disconnects the hoisting motor stator windings from the supply lines. At the same time, dynamic brake resistances R1, R2 and R3 are connected across the stator windings by the closing of contacts 7 and 8 and condensers C1, C2 and C3 are connected across the stator windings by the closing of contacts 6 and 5. The condensers provide excitation for the hoisting motor, thereby causing the motor to act as an induction generator driven by the elevator car or counterweight, depending upon load conditions. The resistances act as a load, causing the motor to deliver power current. This current is dissipated in these resistances which, together with the energy dissipated in the motor, produces a dynamic braking effect to slow down the motor. This effect decreases as the speed of the motor decreases due to the decrease in voltage and frequency incident to the reduction in speed. The electromechanical brake acts to bring the car to a final stop and to hold it while at rest.

Similar operation is had for downward travel of the elevator car. Down reversing switch D, upon engaging contacts 19, 20 and 21, causes the release of the electromechanical brake and the application of voltage of a reverse phase rotation to the elevator motor stator windings to effect downward travel of the car. In dropping out to disconnect the motor from the supply mains, the down reversing switch recloses contacts 18 and 17 to connect the dynamic brake resistances across the motor windings and recloses contacts 16 and 15 to connect the excitation condensers across these windings.

The value of the exciting current of the motor, after the disconnection of the motor from the supply mains, is dependent on the reactance of the condensers. The reactance of the condensers is determined not only by their capacity but also by the frequency of the E. M. F. of the motor stator, and thus the speed of the motor. As the speed of the motor decreases, the frequency of its stator E. M. F. decreases and therefore the reactance of the condensers increases. Thus the exciting current decreases with motor speed; and the flux, which is proportional to the exciting current, likewise decreases. This results in a decrease in the stator E. M. F. The stator E. M. F. is further decreased as the speed of the motor decreases due to the fact that the decrease in speed decreases the rate at which the lines of flux are cut. In other words, the terminal voltage of the motor decreases as its speed decreases, not only because of the decrease in the amount of flux produced but also because of the decrease in rate at which the decreasing flux is cut. Consequently, the dynamic braking effect obtained is greatest at the start of the slow down and falls off rapidly as the speed of the motor decreases.

The speed at which an induction motor is operating is dependent on the load. It will be operating at a higher speed when it is disconnected from the supply mains if it is lowering a heavy load than if it is lifting a heavy load. This means not only that the saturation curve of the machine is lower for increasing loads but that, as the frequency of the motor E. M. F. is lower the lower the motor speed, the reactance of the condensers increases for increasing loads. Thus, the effect of condensers which are capable of exciting the motor, say when the motor is lowering a load, becomes less with increasing loads and is of shorter duration. In other words, the excitation of the motor and therefore the dynamic braking effect decreases and is of shorter duration the heavier the load on the motor. By selecting condensers of proper capacity, a condition may be obtained in which a maximum dynamic braking effect of a maximum duration is exerted upon disconnection of the motor from the supply mains when the motor is lowering full load and in which both the degree and duration of the braking decreases with increasing loads until, when the motor is lifting full load, the dynamic braking effect is negligible. Such arrangement compensates for varying load conditions in stopping. This tends to equalize the distance required to slow down and stop the car under varying load conditions, aiding in bringing the car to an exact landing level.

Due to their decrease in reactance with higher frequencies, condensers act to accentuate any harmonics which may be present in an alternating current E. M. F. Such harmonics are present in the terminal E. M. F. of the motor and if any of them should be of considerable magnitude, which may be the case with the lower harmonics such as the third and the fifth, the accentuation of these harmonics by condensers may prove objectionable, especially because of the hum produced thereby. This may be overcome by the provision of inductances in series with the condensers. The inductances and condensers are chosen so that, for the fundamental frequency, the circuit provides condensive reactance of a value such as to provide the desired excitation of the motor while, for the harmonics, the circuit provides inductive reactance of relatively high values, thus not only causing the harmonics generated to be non-exciting but causing them to be of low value as well. The inductances have the effect of decreasing the size of the condensers needed to provide the desired condensive reactance of the circuit for the fundamental frequency. Also, with inductances provided, the voltage across the condensers for the fundamental frequency will be higher than the terminal voltage of the motor so that condensers capable of withstanding this higher voltage should be provided. The dynamic brake resistances are preferably of a value such as to cause the dynamic braking effect, under conditions where the motor is lowering full load, to be the maximum which can be obtained consistent with smoothness of retardation and comfort to occupants of the car.

It may be desirable, in certain instances, to control the dynamic brake resistances in steps, connecting a certain amount of resistance across the motor winding initially and decreasing this resistance as the motor slows down, as for example where the immediate connection of dynamic brake resistance of the desired value across the motor winding might result in a dynamic brake effect being initially too great. The condensers may be controlled in steps if desired to increase their capacity after the initial slow down has taken place, thereby maintaining the exciting current for the motor over a more extended period. The same effect may be had by increasing the value of the inductances after the initial slow down has taken place.

The condensers may be connected permanently across the motor stator windings, if desired, improving the power factor of the system. Also, if desired the condensers may be connected across the motor windings through a bank of step up transformers. This permits smaller condensers to be used. If the condensers are arranged to be connected in only during slow down, they may be controlled in such way that their connection to the motor windings is effected prior to the disconnection of the motor from the supply mains.

The coil of the electromechanical brake has been shown as controlled by contacts on the reversing switches. It is to be understood that the manner in which the brake is controlled depends upon the requirements of the particular installation.

Advantage may be taken in various ways of the principles of the invention and many apparently widely different embodiments of the invention could be made without departing from the scope thereof. It is therefore intended that all matter contained in the above description or shown in the accompanying drawing shall be interpreted as illustrative and not in a limiting sense.

What is claimed is:

1. In combination; an induction motor; a load therefor; a source of alternating current; means for controlling the connection of said motor to said source; condensive reactance means; means for connecting said condensive reactance means across said motor to provide excitation therefor when it is disconnected from said source; means for dissipating power from said motor when thus excited to produce a dynamic braking effect; and means for controlling the excitation of said motor provided by said condensive reactance means so as to effect the desired excitation of said motor at the fundamental of the frequency of the motor E. M. F. and to reduce the value of current due to harmonics of said fundamental frequency to a low value.

2. In an elevator system; an elevator car; a counterweight therefor; a polyphase induction motor for raising and lowering said car and counterweight; a source of polyphase alternating current; means for controlling the connection of the stator windings of said motor to said source; a plurality of condensers; a plurality of inductances; means for connecting said condensers and inductances in series to said motor to provide excitation therefor when it is disconnected from said source; a plurality of resistances; and means for connecting said resistances across said motor when thus excited to dynamically brake said motor, the value of said inductances and the capacity of said condensers being such as to effect the desired excitation of said motor at the fundamental of the frequency of the motor E. M. F. and to reduce the value of current due to harmonics of said fundamental frequency to a negligible value.

3. In an elevator system; an elevator car; a counterweight therefor; a three phase squirrel cage induction motor for raising and lowering said car and counterweight; a source of three-phase alternating current; means for connecting the stator windings of said motor to said source and for disconnecting it therefrom; a plurality of condensers; a plurality of inductances; means for connecting said condensers, with said inductances in series therewith, across the stator windings of said motor to provide excitation for said motor when it is disconnected from said source, causing it to act as a generator; a plurality of resistances; and means for connecting said resistances across the stator windings of said motor when thus excited to dynamically brake said motor, the value of said inductances and the capacity of said condensers being such as to cause excitation of said motor at the fundamental of the frequency of the motor E. M. F. to effect the greatest dynamic braking action over the longest period when the motor is lowering full load and to prevent excitation of said motor at harmonics of said fundamental frequency and reduce the value of current due to such harmonics to a low value.

ANTHONY PINTO.